United States Patent [19]
Huxley, III et al.

[11] 3,861,535
[45] Jan. 21, 1975

[54] STRADDLE FORK VEHICLE

[75] Inventors: Thomas C. Huxley, III, Camarillo; Duane L. Garber, Port Hueneme; Thomas C. Huxley, IV, Camarillo, all of Calif.

[73] Assignee: Ag. Automation, Camarillo, Calif.

[22] Filed: June 29, 1973

[21] Appl. No.: 374,990

[52] U.S. Cl. ............. 214/6 B, 180/44 F, 214/6 BA, 214/394, 214/670, 214/674, 214/750
[51] Int. Cl. ............................................. B65g 57/32
[58] Field of Search ....... 214/6 B, 6 BA, 75 G, 390, 214/392, 394, 396, 670, 730, 750, 674; 180/43 R, 44 F

[56] References Cited
UNITED STATES PATENTS

| | | | |
|---|---|---|---|
| 2,678,106 | 5/1954 | Vonderheide | 180/44 F X |
| 3,039,637 | 6/1962 | Akrep | 214/670 |
| 3,057,486 | 12/1969 | Moulthrop et al. | 214/6 BA |
| 3,202,232 | 8/1965 | Rogers | 214/670 X |
| 3,235,105 | 2/1966 | Loomis | 214/75 G |
| 3,243,007 | 3/1966 | Berckhan | 180/43 R |
| 3,280,998 | 10/1966 | Stevens | 214/392 |
| 3,486,636 | 12/1969 | Strop | 214/6 BA |
| 3,682,334 | 8/1972 | Breitfuss | 214/75 G |
| 3,765,546 | 10/1973 | Westerling | 214/6 BA |

FOREIGN PATENTS OR APPLICATIONS 760,808　11/1956　Great Britain ...................... 214/750

Primary Examiner—Albert J. Makay
Assistant Examiner—Leslie J. Paperner
Attorney, Agent, or Firm—Pastoriza & Kelly

[57] ABSTRACT

A straddle fork vehicle includes a four wheel frame structure and fork lift assembly positioned between the front and rear wheels. The design is such that the vehicle wheels can straddle pallet bins designed to hold produce during harvesting operations. Because of the straddling feature, bins may be picked up, transported, and deposited along box rows between trees in a grove or orchard in an efficient and rapid manner.

7 Claims, 8 Drawing Figures

STRADDLE FORK VEHICLE

This invention relates generally to agricultural equipment and more particularly to an improved vehicle particularly useful for the handling of pallet bins in the field during harvesting operations.

BACKGROUND OF THE INVENTION

Conventional harvesting such as picking lemons, oranges, and the like in groves has, prior to the advent of bulk handling involved the use of field boxes within which fruit is deposited from sacks carried by the workers. These field boxes are then collected and the produce usually transferred to the packing house for processing and storing.

Instead of field boxes, pallet bins can advantageously be used. Such pallet bins designed for bulk handling of fruit are approximately four feet by four feet by two feet deep and can be transported about by conventional fork lifts in the manner of usual pallets. They contain the equivalent of 17 to 18 field boxes.

A substantial time savings in harvesting operations could be effected if the pallet bins themselves could be transported directly to a field or grove and positioned conveniently so that the produce picked by the workers could be deposited directly from their sacks into the pallet bins. The pallet bins could then be removed and transported to the packing house.

Efforts have been conducted along the foregoing lines but because the box rows or path ways between rows of trees must be kept clear in order that a conventional type fork lift can travel down the path and manipulate the pallet bins, it has been necessary to deposit the pallet bins between adjacent trees in the tree rows bordering the box row. Such depositing of the pallet bins requires substantial manipulation with the field fork lift which in itself is a time consuming operation. Moreover, placement of the large sized pallet bins between adjacent trees can often damage the trees.

Other problems encountered by utilizing a conventional field fork lift in manipulating pallet bins result from the relative heavy structure of the fork lift itself because of its counterweight. Not only can soil compaction be aggravated by the fork lift but irrigation ditches can be clogged or damaged when attempting to deposit the bins to the side of the box row. Moreover, the field fork lift is not capable of carrying stacked bins without them falling off because of furrows, ditches, and sloping terrain thus limiting its use.

BRIEF DESCRIPTION OF THE PRESENT INVENTION

With the foregoing considerations in mind, the present invention contemplates a novel mechanism in the form of a straddle fork vehicle specifically designed for the picking up, transporting, and depositing of pallet bins designed to hold produce during harvesting operations in a manner which is rapid and efficient and wherein the various problems encountered with conventional field fork lifts are avoided and/or overcome.

More particularly, the invention comprises a straddle fork vehicle including a frame structure of generally rectangular shape when viewed in plan. This frame structure itself includes first and second horizontally forwarding extending rail structures spaced in parallel relationship to define a front opening of width sufficient to receive a pallet bin. A fork lift assembly in turn is mounted on the rear portions of the rails with the fork prongs extending forwardly between the rail structures. The basic frame structure itself includes front and rear vehicle wheels mounted to the lower front end portions of the rail structure and to the rear corners of the frame structure respectively and spaced relative to the frame structure and to each other to provide a vertical clearance between the underside of the frame structure and the ground of greater height than the height of a pallet bin.

With the foregoing arrangement, the vehicle can ride over a pallet bin, the wheels passing on either side of the bin in a straddling configuration. The bin may then be lifted up by the fork lift assembly, the center of gravity of the pallet load being between the front and rear wheels so that the vehicle is stable without the use of counterweights.

As a consequence of the staddling feature, the box row between tree rows in a grove can be used for depositing the pallet bins without obstructing passage of the vehicle along the row. Placing of pallet bins between adjacent trees and the attendant maneuvering of the forklift is thus avoided.

The straddle fork vehicle includes many further features resulting in rapid and efficient harvesting operations all as will become clearer as the description proceeds.

BRIEF DESCRIPTION OF THE DRAWINGS

A better understanding of this invention will be had by now referring to the accompanying drawings in which.

DETAILED DESCRIPTION OF THE PREFERRED EMBODIMENT

Figure 1:
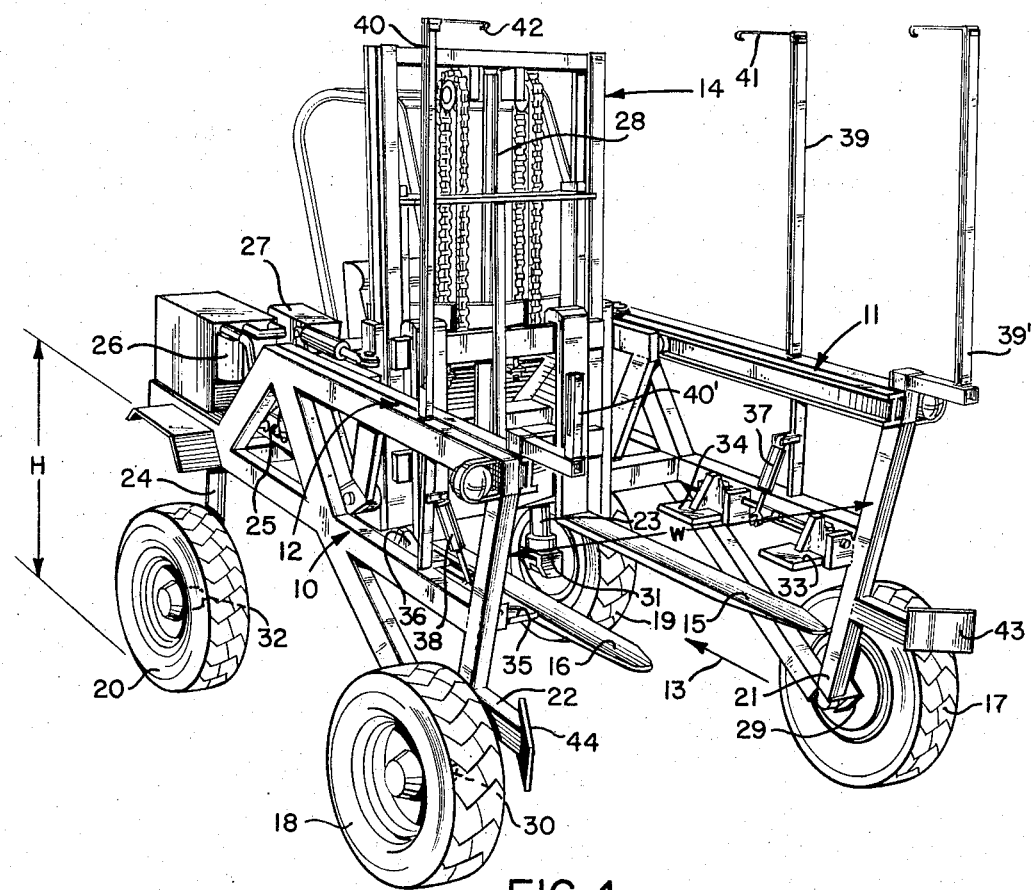
FIG. 1 is a perspective view of the straddle fork vehicle in accord with the present invention.

Referring first to FIG. 1 the straddle fork vehicle includes a frame structure 10 of generally rectangular shape when viewed in plan. This frame structure includes first and second horizontally forwardly extending rail structures 11 and 12 spaced in parallel relationship to define a front opening as indicated by the arrow 13.

Mounted on the rear portions of the rail structures is a fork lift assembly 14 including fork prongs 15 and 16 extending forwardly between the rail structures 11 and 12.

As shown, there are provided front and rear vehicle wheels 17, 18 and 19, 20 mounted respectively to the lower front end portions of the rail structures 11 and 12 as shown at 21 and 22, and to the lower rear corners of the frame structure 10 as at 23 and 24. The spacing between the wheels is at least equal to the width W of the opening 13 between the front portions of the rail structures 11 and 12. The mounting of the individual wheels in turn is such as to provide a vertical clearance between the underside of the frame 10 and the ground indicated at H. The dimensioning is such that a conventional size pallet bin can readily be straddled by the wheels and clear the underside of the vehicle, the values of W and H exceeding the width and depth of a pallet bin.

In the preferred embodiment of the invention, the vehicle is powered by a single, internal combustion engine indicated generally at 25 coupled to a hydraulic pump 26. The pump 26 connects to a closed hydraulic line control system 27. This system provides hydraulic fluid to the fork lift assembly main raising and lowering cylinder 28 as well as to individual hydraulic motors for the wheels located at 29, 30 for front wheels 17, 18 and 31, 32 for the rear wheels 19 and 20.

Coupled to the inside portions of each of the first and second rail structures 11 and 12 are stacking bar means in the form of plate members 33, 34, 35, and 36. Suitable actuating means in the form of hydraulic cylinders 37 and 38 are provided for moving the plate members between horizontal and vertical positions, these actuating means being under control of the operator of the vehicle. The purpose for the stacking bar means will become evident as the description proceeds.

Also provided on the first and second rail structures 11 and 12 are vertical extensible means 39 and 40 terminating in engaging hooks 41 and 42. These hooks cooperate with the stacking bars to aid in supporting a stack of pallet bins carried by the vehicle. Additional extensible means 39' and 40' may also be provided on the front portions of the rail structures.

The lower front portions of the rail structures 11 and 12 include guide plates 43 and 44 which aid in guiding a pallet bin between the rail structures as will become clear when the operation of the vehicle of FIG. 1 is described with reference to the remaining drawings.

Figure 2:
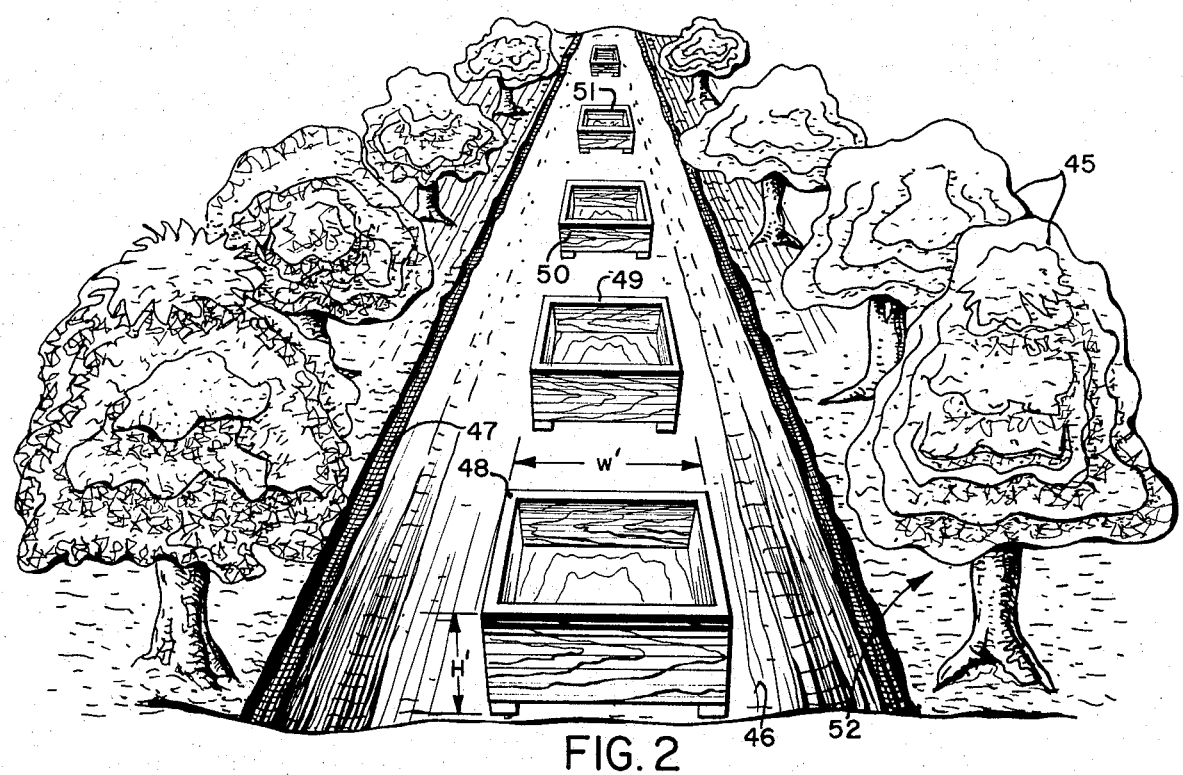
FIG. 2 is a fragmentary perspective view of a box row in a grove useful in explaining the manner in which the vehicle of FIG. 1 operates.

To understand the basic operation of the vehicle and the various problems which are overcome during a harvesting operation, reference is now had to FIG. 2 which illustrates a typical grove which might constitute rows of lemon trees 45 with the usual box row or path between tree rows 46 providing access to the trees for harvesting operations. It is not uncommon for the path 46 to include an irrigation furrow 47 along one side as illustrated.

In harvesting operations as presently practiced prior to the present invention wherein pallet bins are used, the bins cannot simply be deposited in a row along the access path 46 such as indicated at 48, 49, 50 and 51 since the presence of these pallet bins would block movement of conventional field fork lifts or other equipment utilized in handling the bins. Accordingly, and as mentioned heretofore, the present practice is to deposit the bin with a field fork lift between adjacent trees such as in the area indicated by the arrow 52. Positioning the pallet bins in this manner is not only awkward but can cause serious damage to low skirted trees.

Considering now the straddle fork vehicle described in FIG. 1 it is possible to deposit the pallet bins in a neat row along the access path 46 as indicated in FIG. 2. Further, so depositing the pallet bins will in no way obstruct or impede movement of the vehicle since it is dimensioned to straddle the pallet bins as described.

A typical pallet bin such as 48 in FIG. 2 is shown with a width W' and a height H'. Normally, the boxes are square in plan view with a side such as indicated at W' of 4 feet and a height H' of at least 2 feet.

The width and height dimensions W and H described in FIG. 1 are greater than the W' and H' dimensions for the pallet bin shown in FIG. 2 so that the wheels of the vehicle can easily straddle the bin on either side and the respective bins lifted up by the fork lift assembly 14.

Figure 3:
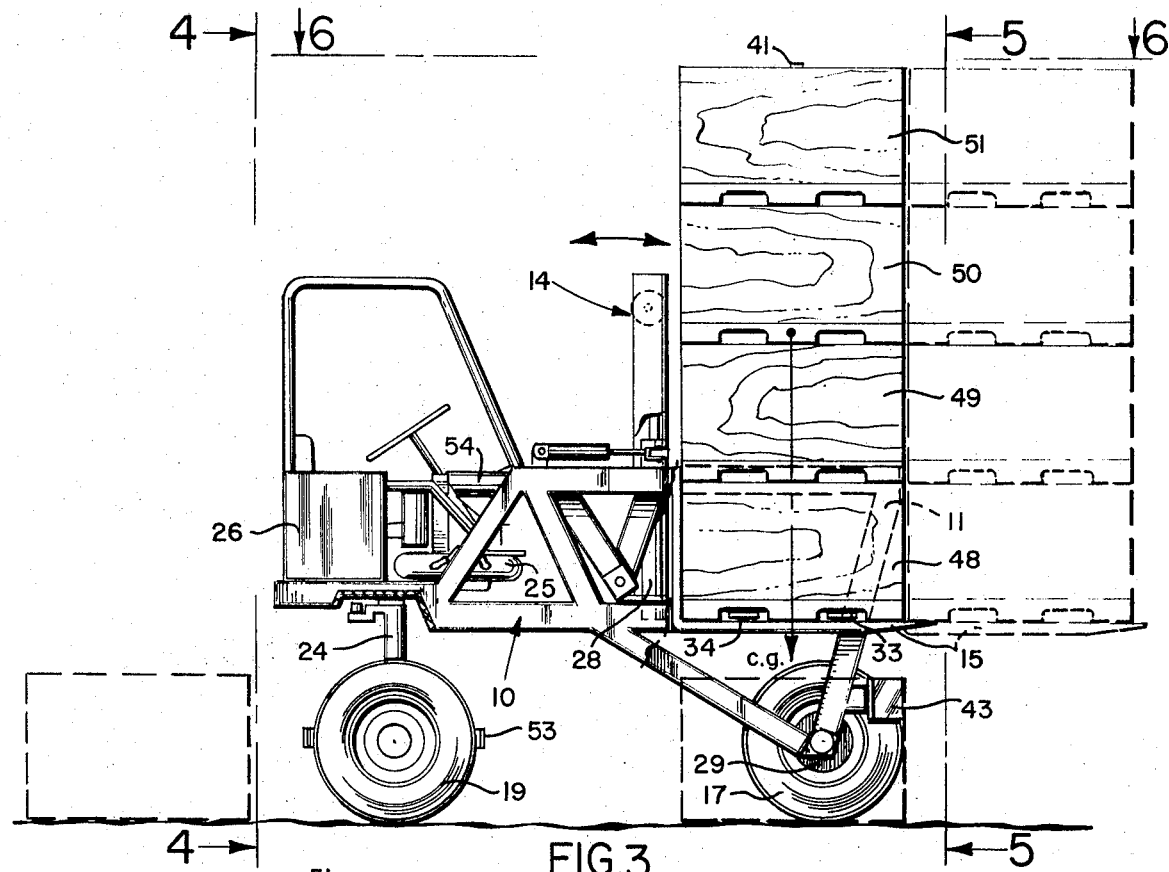
FIG. 3 is a side elevational view of the straddle fork vehicle of FIG. 1.

More particularly and referring now to FIG. 3, the pallet bins 48, 49, 50 and 51 described in FIG. 2 are shown in stacked relationship on the fork lift assembly 14 of the vehicle. The bottom pallet bin 48 is supported by the stacking bar plates 33 and 34 visible in the broken away portion of FIG. 3 so that the fork prongs one of which is shown at 15 could be lowered and are no longer necessary to support the stack.

It will also be noted in FIG. 3 that the upper hook 41 of the extension member 39 described in FIG. 1 engages over the top edge of the stack of bins to provide stability.

In FIG. 3, the same numerals have been utilized to designate corresponding components described in FIG. 1. In addition, there is shown in FIG. 3 a curved guide plate structure 53 adjacent the rear wheel 19, there being provided a similar guide plate adjacent the other rear wheel. These rear guide plates cooperate with the front guide plates such as indicated at 43 in helping to guide a pallet bin beneath the vehicle for proper straddling.

An important feature of the present invention is the fact that the fork lift assembly 14 may be moved along the rail structures in a forward or rearward direction, a forward movement direction being depicted by the dotted lines showing in FIG. 3. This movement is accomplished by a cylinder and piston arrangement 54 connected to the hydraulic system and by urging the entire fork assembly 14 forward on the first and second rail structures. The fork prongs of the fork lift can then be manipulated in the manner of a conventional fork lift.

Figure 4:
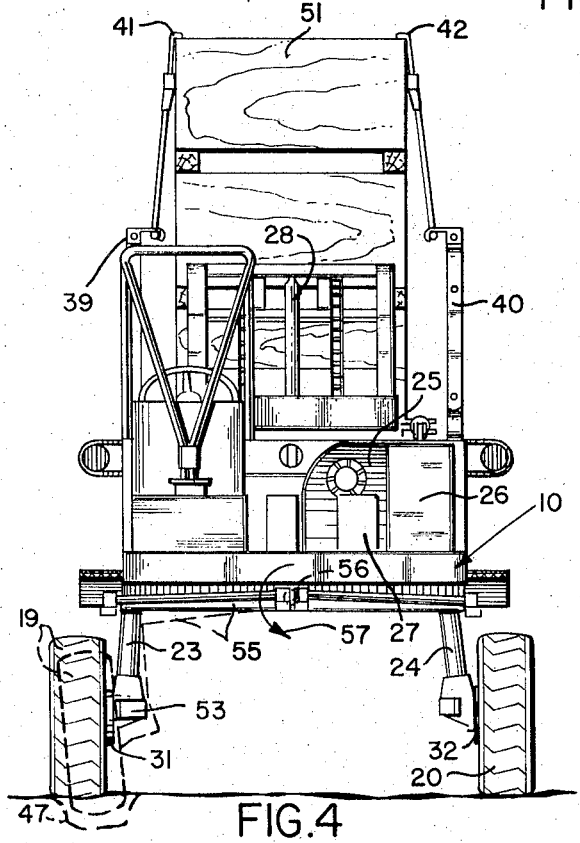
FIG. 4 is a rear elevational view looking in the direction of the arrows 4—4 of FIG. 3.

A further important feature of the present invention incorporated in the combination of components for the vehicle can best be understood by referring to FIG. 4. As shown in this rear view, each of the rear wheels 19 and 20 and their associated swivel means 23 and 24 enable swiveling movement of the wheels about a vertical axis so that steering of the vehicle is accomplished by movement of the rear wheels. The mounting assembly for the rear wheels also includes a pivot means 55 interconnecting the swivel means for each wheel. This pivot means, as shown, is pivoted to a rear central portion 56 of the frame 10 for movement about an axis extending in a forwardly and rearwardly direction; that is, normal to the plane of the drawing.

With the foregoing arrangement, the frame structure may remain substantially level even though one of the rear wheels may encounter a rut. For example, should the rear left wheel 19 fall within the irrigation ditch 47, the pivot means can rock as indicated by the arrow 57 so that the main vehicle frame will remain in a substantially level position. More importantly, the pivot arrangement for the rear wheels assures that the wheels will in most instances always be in contact with the ground and since hydraulic drive motors are associated with these wheels in accord with the four drive system, there is substantially no risk of the vehicle becoming stuck.

As in the case of FIG. 3, various components as viewed from the rear of the vehicle are designated by the same numerals as employed in FIG. 1 for the corresponding components.

Figure 5:
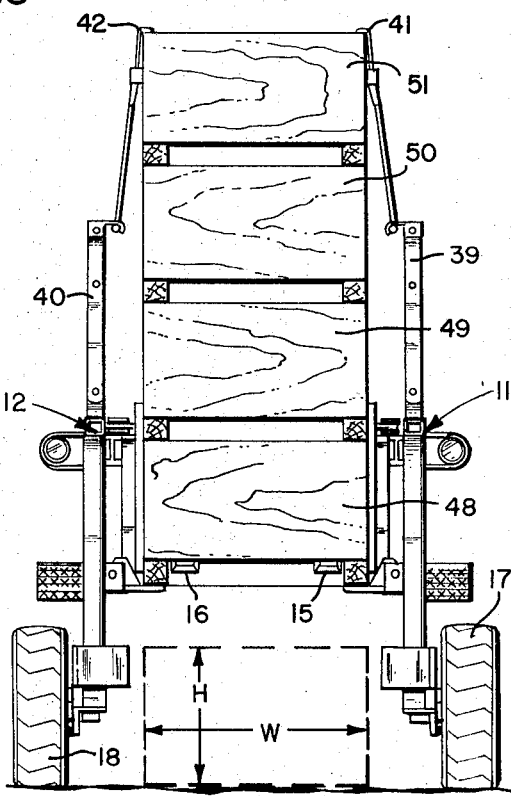
FIG. 5 is a front elevational view looking in the direction of the arrows 5—5 of FIG. 3.

FIG. 5 shows a front elevational view wherein there is indicated by the dotted lines a pallet bin straddled by the vehicle. In this view, the vertical and horizontal or width clearances will be evident such that the vehicle can easily traverse the box row or access path 46 described in FIG. 2 even though several pallet bins may be in positions as shown.

Also in FIG. 5 the manner in which a stack of bins is stabilized by the extensible means 39 and 40 and cooperating upper hooks 41 and 42 will be clear. These extensible structures are biased for retraction downwardly by any suitable means such as springs (not shown). The hooks 41 and 42 themselves will simply be engaged by the upper side edges of a pallet bin as it is being raised or as the stacking takes place. Alternatively, after a stack of four pallet bins, for example, is effected, the extensible means may be manually extended and the hooks 41 and 42 hooked over the sides to thus stabilize the load.

Figures 6, 7, 8:
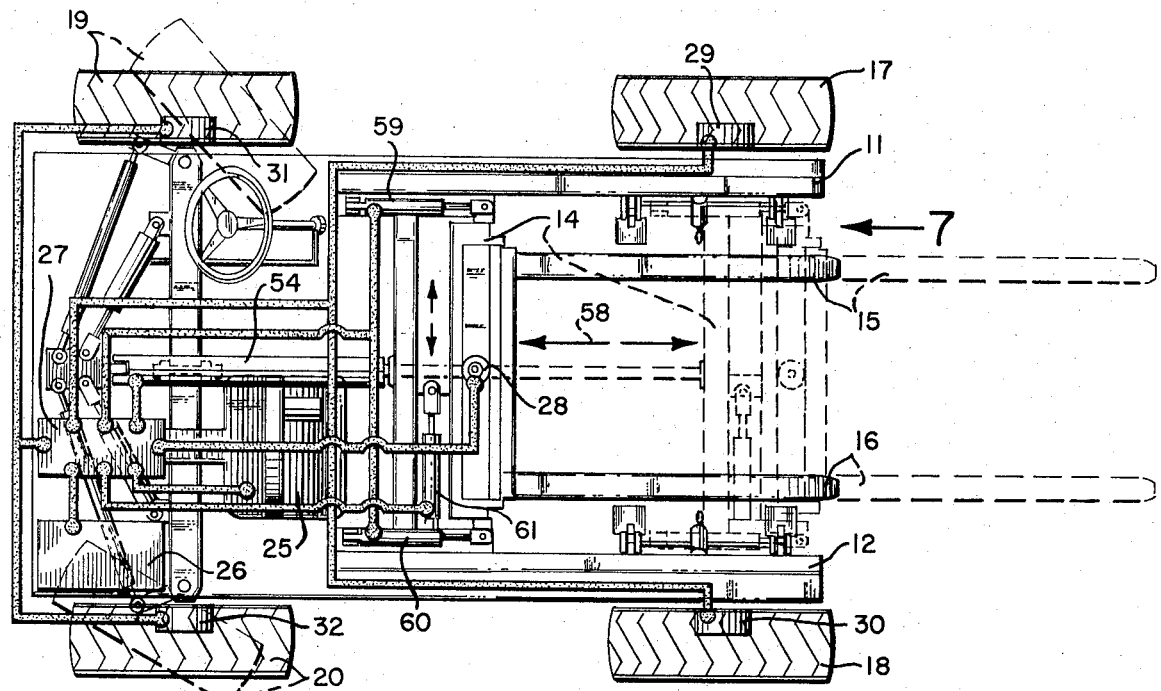
FIG. 6 is a top plan view looking in the direction of the arrows 6—6 of FIG. 3.
FIG. 7 is a fragmentary perspective view of a portion of the structure of FIG. 6 looking in the direction of the arrow 7; and, FIG. 8 illustrates one of the prongs of the fork lift structure incorporating a feature in accord with the invention.

Referring to FIG. 6, there is shown in the plan view and in a schematic manner the hydraulic control system wherein it will be noted that the closed hydraulic control 27 connects to various hydraulic hoses or tubes depicted by the heavy black lines passing to the drive motors for the wheels, the cylinder 54 for moving the fork lift assembly 14 forwardly or rearwardly as indicated by the arrow 58, the main cylinder 28 for raising and lowering the fork prongs, and to further cylinder piston arrangements indicated at 59, 60 and 61. The cylinders 59 and 60 function to tilt the entire fork assembly about an horizontal axis while the horizontal cylinder 61 enables a lateral shifting of the fork lift assembly between the rail structures 11 and 12 in order to facilitate positioning of the fork prongs 15 and 16. The sliding forward movement of the entire fork lift assembly and its extreme forward position is depicted by the dotted lines 58.

While many of the foregoing movements of the fork lift assembly are available on conventional fork lifts, and thus, are not described in detail, these features have not been incorporated in a combination fork lift and straddle vehicle structure as described.

Referring now to the enlarged fragmentary perspective view of FIG. 7, the manner in which the various stacking bar plate members operate to facilitate stacking of the pallet bins on the fork lift assembly will be clear. Since the stacking bar means all operate in the same manner, a detailed description of one will suffice for the others.

Referring specifically to FIG. 7, the stacking bar means 33 is shown as including a flat plate portion 62 arranged to pivot with a pivot bar 63 supported by and running adjacent to the rail structure 11. The pivoting is such that the plate member 62 can be moved between horizontal and essentially vertical positions, the plate being depicted in dotted lines in an intermediate position.

As described in conjunction with FIG. 1, an actuating means in the form of the hydraulic cylinder 37 is coupled to the pivot rod 63 so that movement of the plate member 62 between horizontal and vertical positions can be positively controlled by the operator of the vehicle. Preferably, the plate members such as 62 are biased to a downward position.

With the foregoing arrangement, it will be evident that when the fork prongs such as the prong 15 lifts a pallet bin such as the bin 51 up between the rail structures, the plate member 62 will be engaged and swung upwardly and simply slide along the surface of the pallet bin 51 as indicated by the dotted line. When the fork lift raises sufficiently that the lower edge of the pallet bin 51 passes the plate member 62, it will fall to a horizontal position and thereafter if the fork prong is lowered as indicated by the dashed arrow, the pallet bin 51 will then simply rest on the plate support 62.

If then a next bin 50 is engaged by the fork prongs and lifted upwardly, it will engage the underside of the plate member 62, swinging it up towards the dotted line position and raising the upper bin 51 on top in a stacked arrangement.

The foregoing process can be completed to stack four bins such as illustrated in FIG. 3.

In order to assure even stacking, each of the stacking bar means includes as a part of the plate member 62 an inclined surface 64 such that when a lower edge of a pallet bin is engaged upon dropping of the bin down onto the horizontally disposed plate, should the bin be off center slightly, it will automatically be centered by sliding down the inclined surface.

Referring now to FIG. 8 there is shown one further feature of the present invention in the form of an extension means 65 which may be a metal sleeve or channel member arranged to be received on the ends of the fork prongs such as illustrated for the prong 15. These extension means when attached to the prongs will increase their effective lengths sufficiently that two pallet bins at the same level, one ahead of the other, may be engaged and lifted simultaneously by the fork lift assembly. Actually, it is therefore possible for the straddle fork vehicle to transport a total of eight pallet bins at one time.

From the foregoing description thus far, it will be evident that the straddle fork vehicle is extremely versatile. More particularly, certain designed in features provide double advantages. As an example, the pivot means for the rear wheels of the vehicle and the fact that steering is accomplished by the rear wheels makes towing of the vehicle over highways an extremely simple operation. Thus, the vehicle is actually towed backwards or in a rearward direction, utilizing a positive steering connection so that there can be no possibility of the steering wheels locking at any given position. The unit can thus be quickly connected to a pick up truck with the use of its surge break towbar without any problems.

OPERATION

The operation of the straddle fork vehicle in harvesting a grove of trees such as lemon trees or the like will be readily understood from the foregoing description.

With reference to FIG. 2, it will be evident that empty pallet bins can readily be deposited or full bins can readily be hydraulically stacked up as a consequence of the stacking bar means incorporated within the fork lift assembly. Thus, rather than having to go through the time consuming problem of picking up a bin with the forks, lifting it, accurately positioning it on top of a next bin, backing up to pick up the bottom of the stack and then moving forward again, the straddle fork vehicle of the present invention first approaches a bin, lifts it with its forks, elevates it past the four stacking bar means which then extend under the lower edges of the bin and which at the same time position the bin preparatory to receiving the next bin. Without stopping its forward motion, the vehicle continues forward lowering its empty fork prongs and picks up the next bin, elevating it into contact with the bin already stacked, pushes it up one bin height and on to the next bin.

The reverse of the foregoing operation takes place when positioning or depositing boxes in the box row. Thus, empty bins are held in stacked array and the operator simply drives his vehicle in a reverse direction, dropping one bin at a time without stopping the vehicle.

As illustrated in FIG. 2 the various bins are shown empty but properly deposited along the box row or access path 46 preparatory to being loaded with produce. There is no problem of blocking access to the pathway 46 because of the straddling feature of the vehicle so that the boxes or bins can be deposited in passing down the path 46 and after they are loaded, the vehicle will simply pick up the bins as described.

From all of the foregoing, it will be evident, accordingly, that the present invention has provided a vastly improved piece of equipment in the form of the straddle fork vehicle which greatly facilitates and speeds up harvesting operations and avoids many of the problems mentioned heretofore encountered when conventional field fork lifts are used to handle the pallet bins.

What is claimed is:

1. A straddle fork vehicle vehicle for picking up, transporting, and depositing pallet bins designed to hold produce during harvesting operations, comprising, in combination:
   a. a frame structure of generally rectangular shape when viewed in plan including first and second horizontally forwardly extending rail structures spaced in parallel relationship to define a front opening of width sufficient to receive a pallet pin;
   b. a fork lift assembly mounted on the rear portions of the rail structures with fork prongs extending forwardly and movable vertically up and down to pass between said rail structures;
   c. front and rear vehicle wheels mounted to the lower front end portions of the rail structures and to the rear corners of the frame structure respectively, and spaced relative to the frame structure and each other to provide a vertical clearance between the underside of the frame structure and the ground of greater height than the height of a pallet bin such that the vehicle can ride over a pallet bin, the wheels passing on either side of the bin in a straddling configuration whereby a pallet bin may be straddled by the vehicle and lifted up by said fork lift assembly, the center of gravity of the pallet load being between the front and rear wheels so that the vehicle is stable without the use of counterweights the mounting of each of the rear wheels including swivel means permitting swiveling of the wheel about a vertical axis; pivot means interconnecting the swivel means for each wheel, said pivot means being pivoted to a rear central portion of said frame for movement about an axis extending in a forward and rearward direction whereby the frame may remain in a substantially level position should one of the rear wheels encounter a rut; and,
   d. means on said frame coupled to said fork lift assembly to move it horizontally forwardly and rearwardly along said rail structures such that the fork prongs may extend beyond the front ends of the rail structures to permit the fork lift assembly to operate in the same manner as a conventional fork lift.

2. A vehicle according to claim 1, including a single internal combustion engine; a hydraulic pump coupled to said engine for operation thereby; and a closed hydraulic line control system connected to said pump and including first hydraulic drive means for driving the front wheels and second hydraulic drive means for driving the rear wheels to provide a four wheel drive, said first and second hydraulic drive means being independently operable.

3. A vehicle according to claim 2, in which said closed hydraulic line control system includes individual piston and cylinder controls for said fork assembly enabling the assembly to be moved forwardly and rearwardly along said rail structures, tilted about a horizontal axis, translated in sidewise directions between said rail structures, and enabling said fork prongs to be raised and lowered relative to the ground.

4. A vehicle according to claim 1, including extension means attachable to the fork prongs of said fork lift assembly to enable two pallet boxes at the same level, one ahead of the other, to be engaged and lifted simultaneously by said fork lift assembly.

5. A straddle fork vehicle for picking up, transporting, and depositing pallet bins designed to hold produce during harvesting operations, comprising, in combination:
   a. a frame structure of generally rectangular shape when viewed in plan including first and second horizontally forwardly extending rail structures spaced in parallel relationship to define a front opening of width sufficient to receive a pallet bin;
   b. a fork lift assembly mounted on the rear portions of the rail structures with fork prongs extending forwardly and movable vertically up and down to pass between said rail structures;
   c. front and rear vehicle wheels mounted to the lower front end portions of the rail structures and to the rear corners of the frame structure respectively, and spaced relative to the frame structure and each other to provide a vertical clearance between the underside of the frame structure and the ground of greater height than the height of a pallet bin such that the vehicle can ride over a pallet bin, the wheels passing on either side of the bin in a straddling configuration whereby a pallet bin may be straddled by the vehicle and lifted up by said fork lift assembly, the center of gravity of the pallet load being between the front and rear wheels so that the vehicle is stable without the use of counterweights; and, stacking bar means coupled to the inside portion of said rail structures, each of said means including a plate member pivoted for swinging movement between a horizontal and vertical position, and dimensioned such as to permit a pallet box to be raised past the member when in a vertical position and to engage under a side edge of the pallet box when in a horizontal position to support the pallet box between the rail structures so that the prongs of the lift fork can be lowered to pick up another pallet box; and actuating means under control of the operator of the vehicle to positively move the plate members between their horizontal and vertical positions.

6. A vehicle according to claim 5, in which each of said plate members includes an inclined surface portion to guide a pallet bin to a centered position between the rail structures when the bin is held by the bar means.

7. A vehicle according to claim 5, in which each of said rail structures includes a vertical extensible means terminating in an engaging hook, said extensible means being biased to a retracted position, whereby the hook may engage over the upper side edge of a pallet bin to aid in supporting a stack of bins carried by the vehicle.

* * * * *